Patented May 27, 1952

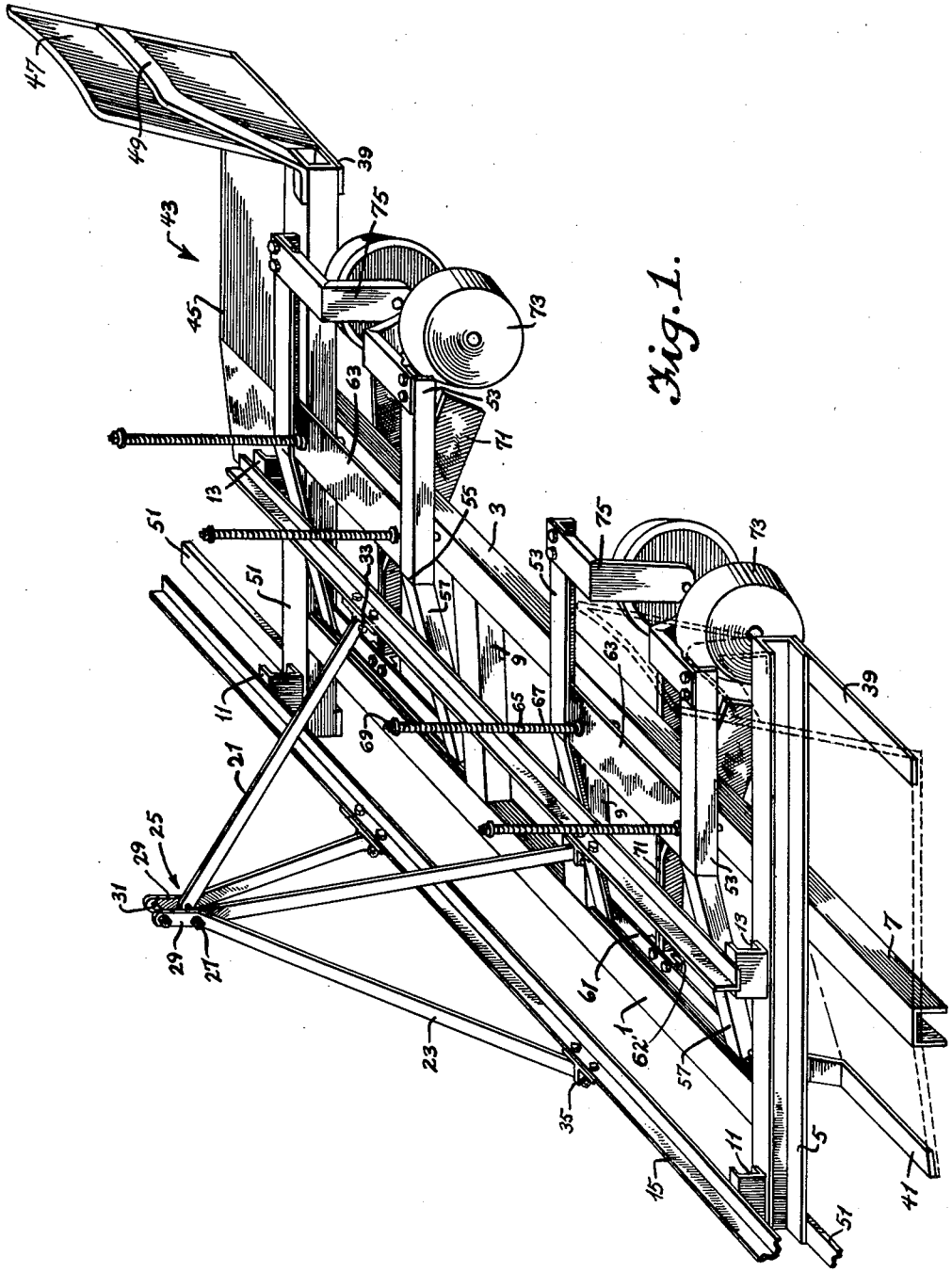

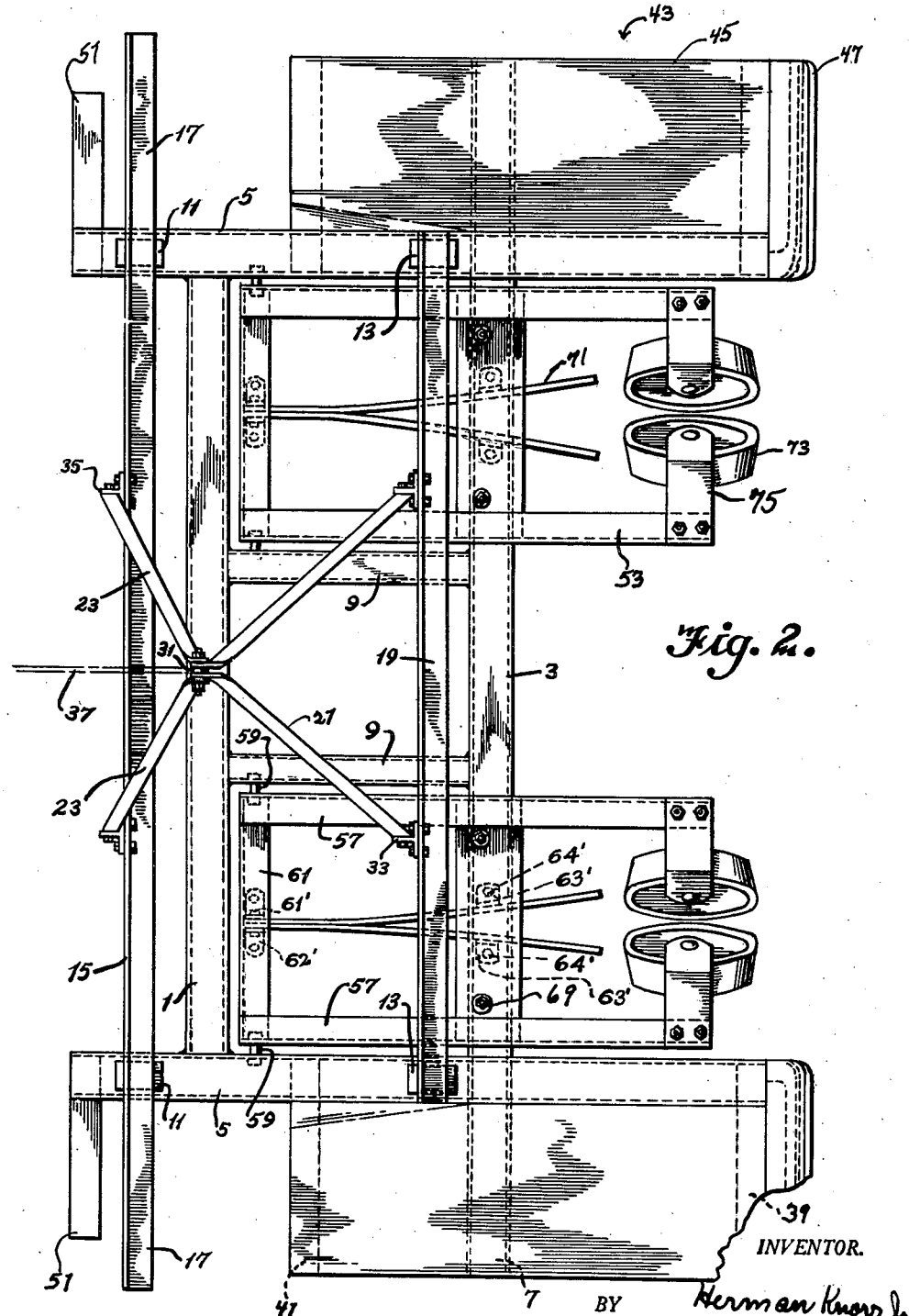

2,597,936

UNITED STATES PATENT OFFICE 2,597,936

TRANSPLANTER

Herman Knorr, Jr., Shiocton, Wis., assignor of one-half to H. J. Brandt, Black Creek, Wis.

Application June 27, 1947, Serial No. 757,598

1 Claim. (Cl. 111—62)

This invention relates broadly to the art of transplanters, and in its more specific aspects, it relates to a planter platform floatingly carried and drawn by a tractor or the like agricultural vehicle; and the nature and objects of the invention will be readily recognized and understood by those skilled in the arts to which it relates in the light of the following explanation and detailed description of the accompanying drawings illustrating what I at present believe to be the preferred embodiments and mechanical expressions of the invention from among various other forms, arrangements, combinations, and constructions, of which the invention is capable within the spirit and scope thereof.

It is customary practice in placing plants in large and sometimes in relatively small acreage operations to provide what is commonly termed a platform transplanter which is adapted to be hauled behind either a tractor or the like towing vehicle, or may be horse-drawn. Such transplanter platform includes generally a share or plow which digs a furrow into which plants may be manually dropped or inserted, and also includes shoes, press rolls or the like, which act to cover the furrow about the roots of the plant and to pack the same in proper growing position in the ground. Many of such transplanter platforms are supported by wheels or the like for traversing the ground.

The primary purpose of my invention is to provide a platform transplanter which is floatably supported from a towing vehicle and includes a basic frame and sub-frames so mounted and arranged that the sub-frames which carry earth compacting means may rock relative to the basic frame in following the ground contour.

I have also designed my transplanter and mounted the furrow forming means thereon so that the sub-frames may rock independently of the furrow forming means and the latter will operate effectively regardless of ground contour.

The platform transplanter of this application provided for the concurrent planting of two rows by seated operators, the combination of the various parts of the planter being such that the balance thereof is maintained and certain parts may rock relative to other parts and the planting operation may be efficiently carried on.

With the foregoing general objects, features, and results in view, as well as certain others which will be apparent from the following explanation, the invention consists in certain novel features and designs, construction, mounting and combination of elemets, as will be more fully and particularly referred to and specified hereinafter.

Referring to the accompanying drawings:

Fig. 1 is a perspective view of the platform transplanter.

Fig. 2 is a plan view of the platform transplanter.

Referring to the accompanying drawings, my platform transplanter comprises a basic floating frame composed of various metallic elements which I am about to describe and which are so associated and joined together as to produce a rigid integrated frame work. The basic floating frame comprises a front or fore transverse sill member 1, preferably consisting of a channel bar, and a rear or aft transverse channel bar sill 3, spaced from the fore sill 1. The transverse sills 1 and 3 are welded or otherwise fixedly secured to and extend between a pair of side longitudinal channel bars or members 5 which extend the length, in a fore and aft direction, of the transplanter. The fore sill 1, extends between the longitudinal members 5 and is preferably attached to the vertical sides thereof, while the rear or aft sill 3 is of greater length than the sill 1, so as to extend outwardly beyond the longitudinal side members 5 as at 7. The sill 3 is attached to the undersurface or side of each lower horizontal flange of the channel members 5. The purpose of so forming and mounting the aft sill 3 in the structure so as to provide projecting ends 7, will be explained in detail hereinafter. I provide two longitudinally extending reinforcing angle bars 9, which are fixedly attached to the sills 1 and 3 and extend therebetween. While I have illustrated in the drawings, two of such reinforcing bars or rods 9, it is to be distinctly understood that I may use a greater or lesser number of these reinforcing structures if I deem it advisable.

Adjacent to the forward ends of the longitudinal side channel members 5, I weld or otherwise fix to the upper horizontal flanges thereof, sleeper forming channel sections 11, and sleeper forming sections 13 are welded or otherwise secured to each longitudinal side member 5 at points thereon rearwardly spaced from the sleeper sections 11. The sleeper sections 13 are fixedly mounted and supported on the longitudinal side members 5 at substantially the mid longitudinal points therealong.

Fixedly secured, in any desirable manner to, and extending between the sleeper sections 11, I provide what I shall term a frame suspension beam 15 of rigid angle iron construction, the suspension beam 15 extending transversely across the forward end of the planter from sleeper sections 11 and projecting at each end as at 17 beyond the longitudinal side members 5. A companion frame suspension beam 19 preferably of angle iron section, and substantially rigid, is welded or otherwise secured to the sleeper sections 13 to extend therebetween. The rear suspension beam 19 is shorter than the forward suspension beam 15, for this rear or aft beam is only sufficiently long and is adapted to only extend between the longitudinal side members for being fixed to the rear sleeper sections 13.

The fore and aft suspension beams 15 and 19 form the supporting or suspension elements for the floating platform transplanter. A hanger frame is attached to the suspension beams, the hanger frame being composed of two rear arms 21 and two forward arms 23, the upper portions of all of these arms being disposed at a common point at 25 where they are fastened together by means of a bolt or the like 27. The upper portions of the forward arms 23 may be angularly bent to provide vertical projections 29 for receiving through the upper ends thereof a bolt 31 for a purpose to be hereinafter described.

The rear hanger arms 21 project rearwardly and downwardly and in a diverging manner from the common point 25 and the lower ends thereof are bolted or otherwise secured as at 33 to the rear suspension beam 19. The forward arms 23 project slightly forwardly and downwardly in a diverging manner from the common point 25 and the lower ends thereof are bolted or otherwise secured as at 35 to the forward suspension beam 15.

It will be recognized that the hanger frame constitutes a four point suspension means for suspending the transplanter in a floating manner from the tractor for hauling or towing over the ground to be planted.

Consideration of the drawings, and particularly Fig. 2 thereof, discloses that the rear suspension beam is fixedly disposed relative to the basic frame of the transplanter in such manner that it extends transversely thereof at substantially the longitudinal center of the frame, and it will be further appreciated that the four points of attachment 33 and 35 of the hanger arms 21 to the suspension beam are laterally displaced with respect to the transverse center of the planter.

The bolt 31 constitutes what I shall term the suspension point of the hanger frame which comprises the four arms, and the bolt is adapted to be removably fastened to a vertically movable arm or boom 37 which projects upwardly and rearwardly from a relatively low point on the tractor. It is this arm or boom which has been hereinabove mentioned as being hydraulically or otherwise operated to move vertically to raise or lower the implement which is being towed by the tractor. The bolt 31 is provided for attachment to the outer end of boom 37 and it will thus be recognized that with the boom attached to the top of the hanger frame, the tractor may tow the transplanter and by raising and lowering the boom, the position of the transplanter relative to the ground being operated upon may be varied.

The hanger frame suspension point 31 is positioned at a point substantially midway between the sides of transplanter but forwardly of the midway point between the front and rear thereof. By this construction, I am enabled to attach the transplanter to the conventional booms now in use on tractors and to floatably, properly balance the implement during the planting operation. The booms of this type and designed for this purpose are of limited length and hence, it has been necessary to forwardly dispose the hanger frame suspension point relative to the midway point between the front and rear of the transplanter, however, I have provided for perfect balance of the transplanter offsetting the positioning of the suspension point by forming the arms 21 to extend from the vertical plane of the suspension point rearwardly to points midway between the front and rear of the transplanter. The forward arms 23 of the hanger frame extend forwardly a distance beyond the plane of the suspension point 31, however it will be recognized that the connecting points 35 are disposed closer to the plane of point 31 than are the connecting points 33.

As has been pointed out above the transplanter of this invention is adapted to seat two operators in a comfortable manner on the basic frame thereof. I provide a pair of seats extending laterally from each longitudinal side member 5, such seats being supported on rear bars 39 rigidly extending laterally from the under sides of the rear or aft ends of the side members. A forward supporting element 41 fixedly extends from each side member and is offset with respect thereto, to provide a support lower than the side member. Each seat I have designated generally by the numeral 43 and comprises a bottom portion 45 supported at the rear by the element 39, at an intermediate point by the projecting end 7 of sill 3, and at the forward lowered end by offset element 41. The seat includes a back 47, supported by an arm 49, which extends into back supporting position from side member 5 to which it is fixed.

The seats and backs thereof may be fabricated of relatively thin gauge sheet metal which may be welded or otherwise secured to the supporting elements just described, and the inner edge of the sheet metal sheet may be fastened to the side member 5 in any suitable manner. It will be observed that by lowering or offsetting element 41, a portion of the bottom of the seat will slope downwardly to provide a more comfortable seat for the operator. Foot rests 51 project laterally from side members 5 to which they may be fixed in any suitable manner.

The transplanter of this invention is adapted for planting two rows concurrently and hence, I provide means for digging two furrows for receiving plants inserted therein by the operators seated upon seats 43, each operator inserting plants in one furrow.

For digging the two furrows and pressing the manually inserted plants therein, I provide two sub-frames floatably carried on the basic frame. Each sub-frame is carried on the transplanter at positions thereon adjacent a seat 43 so that the furrows dug thereby will be easily accessible for plant insertion by the seated operators. Since each sub-frame is similarly constructed and operates and functions in the same manner, I shall describe only one.

Each floating sub-frame is composed of a pair of transversely spaced generally horizontally disposed fore and aft members 53 of angle iron section which extend across sill member 3 to project rearwardly therebeyond. The members 53 forwardly of sill member 3, are bent as at 55 to provide forwardly and downwardly extending portions 57 which extend to a point adjacent to but rearwardly spaced from forward sill member 1. Pivot pins 59 project laterally from the forward ends of portions 57 and are rotatably received in bearing holes provided in side members 5 and reinforcing members 9. A cross bar 61 connects the forward ends of frame portions 57.

For floatably carrying the sub-frames for rocking motion on pivots 59, I provide a transverse plate 63 extending between and fixed to the frame members 53, the plate being in the vertical plane of sill 3. A pair of upstanding bolts 65 are mounted on the sill 3 and extend upwardly therefrom freely and slidably through plate 63. Springs 67 are coiled about the bolts and extend therearound from and between bolt heads 69 and the plate 63. It will be appreciated that the springs act to constantly urge the subframe downwardly toward sill 3 and that a rocking movement may occur with pins 59 functioning as pivots.

A share or plow 71 is pivotally mounted at the nose end thereof to cross member 61 by means of a pivot pin 61' mounted in brackets 62' secured on the lower surface of the cross member, the pivotal axis of the plow or furrow opener 71 being aligned with the pivot pins 59 upon which the sub-frames pivot. From its pivotal mounting on the cross bar the plow extends rearwardly and beneath transverse bar 3 to which it is fixed by means of ears 63' which may be welded to the plow and bolted to bar 3 by volts 64'.

A pair of press rolls 73 are supported from the aft or rear ends of frame members 53 by means of brackets 75.

Thus, the entire sub-frame units, consisting of members 53, 61 and 63 and carrying rolls 73, which are pivotally carried by the basic frame by means of pivots 59 may rock or float over any type of soil, this rocking action occurring against the action of compression springs 67 which constantly urge the rolls into soil packing position. Since each plow 71 is pivoted to a sub-frame and fixed to the basic frame this rocking movement of the sub-frames may take place without affecting the position of the plow or furrow forming means relative to the soil. Thus, as the transplanter is towed by a tractor or the like, the plows in each floating sub-frame will cut furrows in the ground in advance of the press rolls. The operators will deposit plants in the furrows in advance of the press-rolls which will pack the earth around the plants.

With the platform transplanter in operative position suspended from a tractor boom as described, it will be appreciated that the transplanter is floatably supported by the tractor, the only ground contact by any part of the planter being the press rolls and the plow and these do not form a supporting means.

From the above description of my transplanter, read in conjunction with the drawings, it will be clearly recognized that I have devised an agricultural implement which, as it is towed over the ground, concurrently digs two furrows for deposit of plants therein and there packs the plants in proper positions. Furthermore, I have provided such a transplanter which includes two seats each conveniently positioned relative to a furrow so that an operator on each seat may deposit plants in the adjacent furrow thereby planting two rows at one time.

I claim:

In a transplanter adapted to be towed by a towing vehicle, a basic frame composed of transverse and longitudinal members secured together, a pair of transverse suspension beams, one of said beams being secured to the forward portion of said basic frame, the other suspension beam being secured to said basic frame rearwardly of said one beam and substantially at the transverse center line of the basic frame, a plurality of furrow-openers symmetrically arranged with respect to the longitudinal center line of said basic frame, said furrow-openers being fixed to said basic frame rearwardly of said rear suspension beam and extending forwardly thereof, a sub-frame for each furrow-opener pivotally connected to said basic frame on a horizontal axis forwardly of said rear suspension beam and having members straddling the associated furrow-opener and extending rearwardly beyond the same, the rear portions of said sub-frame members carrying means to close and pack the furrows formed by the furrow-openers, seats for operators carried on said basic frame adjacent the furrow-openers and symmetrically arranged with respect to said longitudinal center line, the major portions of said seats being positioned rearwardly of said rear suspension beam, and a hanger frame having members secured to said suspension beams at points symmetrically spaced with respect to said longitudinal center line, said hanger members extending upwardly and converging to a common point forwardly of said rear suspension beam and vertically above said longitudinal center line for connection to support means extending rearwardly from a towing vehicle, whereby the transplanter is supported for movement in balanced relation and the furrow closing and packing means may pivot relative to their furrow openers.

HERMAN KNORR, JR.

REFERENCES CITED

The following references are of record in the file of this patent:

UNITED STATES PATENTS

| Number | Name | Date |
| --- | --- | --- |
| 520,478 | Bemis | May 29, 1894 |
| 934,095 | Rhoades | Sept. 14, 1909 |
| 1,348,862 | Genung | Aug. 10, 1920 |
| 1,633,821 | Mader | June 28, 1927 |
| 1,651,851 | Synck | Dec. 6, 1927 |
| 1,787,538 | LeBoeuf et al. | Jan. 6, 1931 |
| 1,807,474 | England | May 26, 1931 |
| 1,851,936 | Oppenheim | Mar. 29, 1932 |
| 1,886,457 | Winkley | Nov. 8, 1932 |
| 2,230,643 | Hershey | Feb. 4, 1941 |
| 2,363,749 | Rude | Nov. 28, 1944 |
| 2,475,078 | Cherry | July 5, 1949 |

FOREIGN PATENTS

| Number | Country | Date |
| --- | --- | --- |
| 554,033 | Great Britain | June 16, 1943 |